(Model.)
F. B. NICHOLS.
Machine for Converting Reciprocating Motion into Rotary Motion.
No. 236,717.    Patented Jan. 18, 1881.
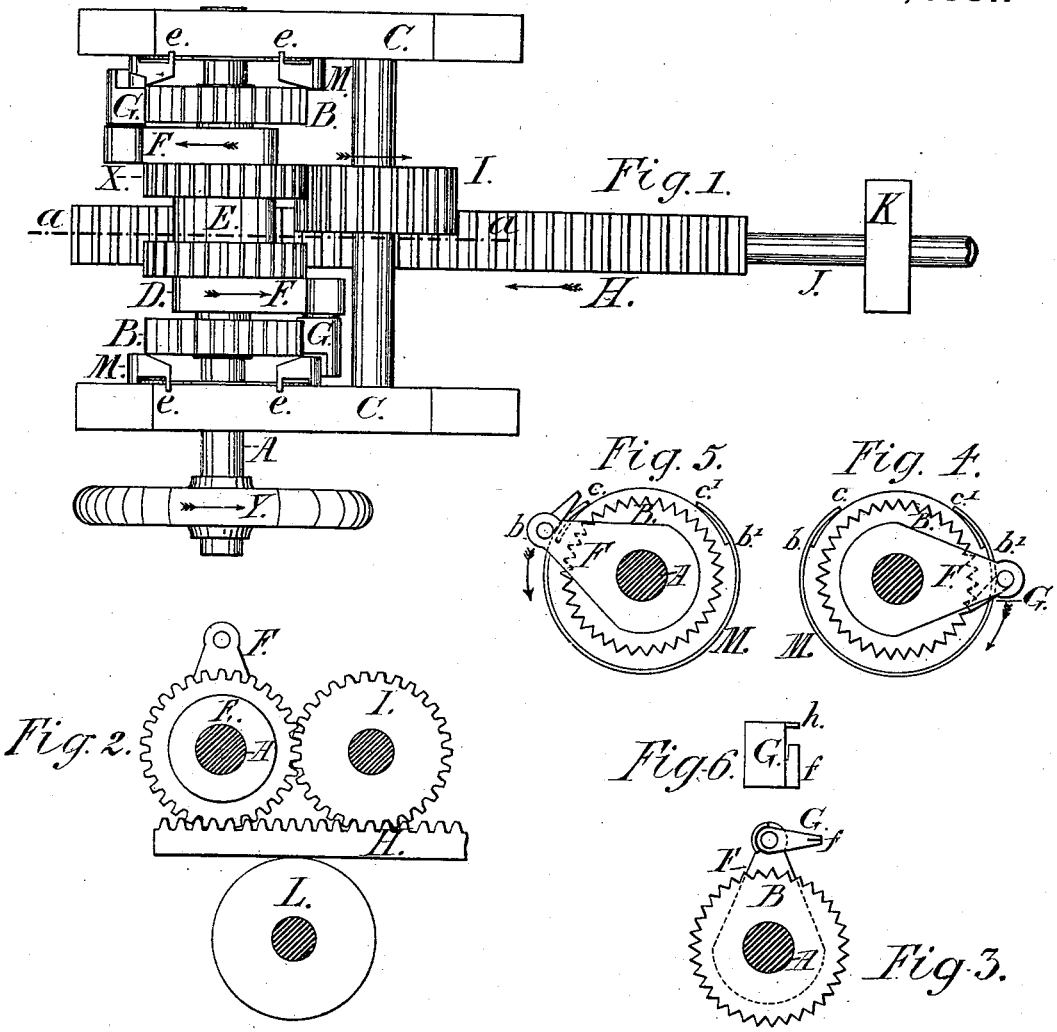
Witnesses.
David Boutilier
George South
Inventor.
Frederic Booth Nichols
N. PETERS, PHOTO-LITHOGRAPHER, WASHINGTON, D. C.

UNITED STATES PATENT OFFICE.

FREDERIC B. NICHOLS, OF HALIFAX, NOVA SCOTIA, ASSIGNOR OF ONE-HALF TO CATHCART THOMSON, OF SAME PLACE.

MACHINE FOR CONVERTING RECIPROCATING MOTION INTO ROTARY MOTION.

SPECIFICATION forming part of Letters Patent No. 236,717, dated January 18, 1881.

Application filed June 11, 1880. (Model.)

*To all whom it may concern:*

Be it known that I, FREDERIC BOOTH NICHOLS, of the city and county of Halifax, and Province of Nova Scotia, have invented a new and useful Improvement in Machines for Converting Reciprocating into Rotary Motion, which improvement is fully set forth in the following specification, reference being had to the accompanying drawings.

Figure 1 is a top view or plan. Fig. 2 is a section through $a\ a$, Fig. 1, showing cog-wheels D I, rack H, and guide-wheel L. Fig. 3 is a section showing the pawl-carrier attached to cog-wheel D, with end view of pawl in the act of dropping from the cam into the ratchet. Fig. 4 is a section showing the pawl going forward engaged with the ratchet. Fig. 5 is a section showing the pawl riding back over the cam. Fig. 6 is the pawl with its spring, and the projection $h$, above the pivot, to prevent its falling away from the cam while passing around on the outside.

The machine consists of a shaft, A, Fig. 1, turning freely in its bearings in the frame C C. This shaft has two ratchet-wheels, B B, securely fastened to it. Between these ratchet-wheels are two cog-wheels, D X, separated by the space E. Each of these cog-wheels have pieces F F fastened to them for the purpose of pivoting the pawls G G in position to perform their functions. These cog-wheels with their pawl-carriers F F rotate freely on the shaft A. One of these cog-wheels, D, gears with the reciprocating toothed rack H. The other one, X, runs clear of the rack H, but gears with one-half of the cog-wheel I, the other half of I gearing with the rack H and in position not to engage with the teeth of the cog-wheel D. This intermediate cog-wheel I causes X to rotate in the opposite direction to the rotation of D. As seen in Fig. 1, X moves in the same direction as the rack, while D and I move in the opposite direction to the rack. Thus, when the rack is pushed in the direction of the arrow (shown below it) the cog-wheels D, X, and I each move in the direction of the arrows annexed to them. On reversing the direction of the rack the rotation of the cog-wheels will likewise be reversed. This alternate rotation of the cog-wheels D and X in opposite directions causes the pawl of the one going forward to engage in the teeth of the ratchet while the other pawl slides back free, and by alternating with each other keep up a constant rotation of the shaft A and fly-wheel Y. The rack H is attached to a piston-rod, J, which can be worked by steam or other power. K represents the stuffing-box of the engine-cylinder. The rack is kept up in gear with the cog-wheels D and I by means of a smooth-faced wheel, L, Fig. 2. Both L and I rotate freely on their axis.

In order to prevent the pawls from clicking over the ratchets in their backward movement I adopt the following device: Two disks, holding the ring-shaped cams M M, are fastened to the inside of the frame, each facing the ratchet-wheels. The ends of these rings from $b$ to $c$ and $b'$ to $c'$, Figs. 4 and 5, are free from the disks and are formed into springs bending inward, the ends $e\ e\ e\ e$, Fig. 1, projecting over and resting on the edge of the disks, which are here made smaller in diameter. This prevents the springs from falling too far. A space is left between the ends of the springs that form a part of the cams, to allow the springs on the pawls to pass up and down. The pawls each have a spring, $f$, Figs. 1 and 6, on the outside, fastened near the point, the upper end being free. These serve as lugs to lift the pawls and carry them around on the outside of the cam in going backward, keeping them clear of the ratchets till an entire rotation is made, when they drop down through the space between $c$ and $c'$. Then on going forward the point of the spring on the pawl passes under the cam-spring, and, pressing against the inside of the cam, forces the pawl down into the teeth of the ratchet, causing it to rotate the shaft, the cam-spring yielding as it passes in and out. Instead of the ends of the cams terminating with springs, pieces can be hinged at $b$ and $b'$ that will rise and fall to allow the pawl-spring to pass in and out.

The movement of the rack should just correspond in length with the circumference of the cog-wheels D X, so that one entire revolution is made at each stroke of the rack, whether going forward or backward. If the movement is stopped at the end of the stroke, either way, the pawls will both be at the top between c and c', when, if desirable to change the direction of the rotation, it can be immediately done by turning both pawls over in the opposite direction and again applying the power to the rack, this arrangement of attaching the springs to the pawls allowing them to work equally well in either direction.

By means of the mechanism above described, which I style a "rotator," the power of the piston is communicated with equal force to produce rotation of the shaft at all parts of its stroke; consequently the engine can be started as readily when the piston is at the end of its stroke as at any other point, or, in other words, never gets "on the center."

It will be evident that the reciprocating movement of a toothed rack made in a segment of a circle and oscillating on a fixed pivot at its radius, can be substituted for the piston movement of a straight rack kept up in place with a guide-roller, and that the common pawl and ratchet can be used where the rotation is only required in one direction, the arrangement of pawls and cams specified being intended for reciprocating-piston engines only; but where the rotary mechanism is actuated by foot-power, the oscillating rack and common pawl and ratchet will be found the most convenient method of applying it.

I claim as my invention—

1. The toothed wheels D and X, with their pawl-carriers and pawls, in combination with the reciprocating toothed rack H or its equivalent, and the intermediate toothed wheel, I, substantially as shown, for the purpose specified.

2. The combination of a reciprocating piston-rod, or its equivalent, with a toothed rack and two toothed wheels carrying pawls that work alternately into ratchets, one of the said wheels, X, being connected with the rack by the intermediate toothed wheel, I, substantially in the manner and for the purpose described.

3. The springs $f$, attached to the pawls, substantially as shown, for the purpose specified.

4. The pawl-springs $f$, in combination with the ring-shaped cams M M and cam-springs $b$ $b'$, or their equivalents, substantially in the manner and for the purpose described.

FREDERIC BOOTH NICHOLS.

Witnesses:
GEORGE SOUTH,
DAVID BOUTILIER.